Figure 1:
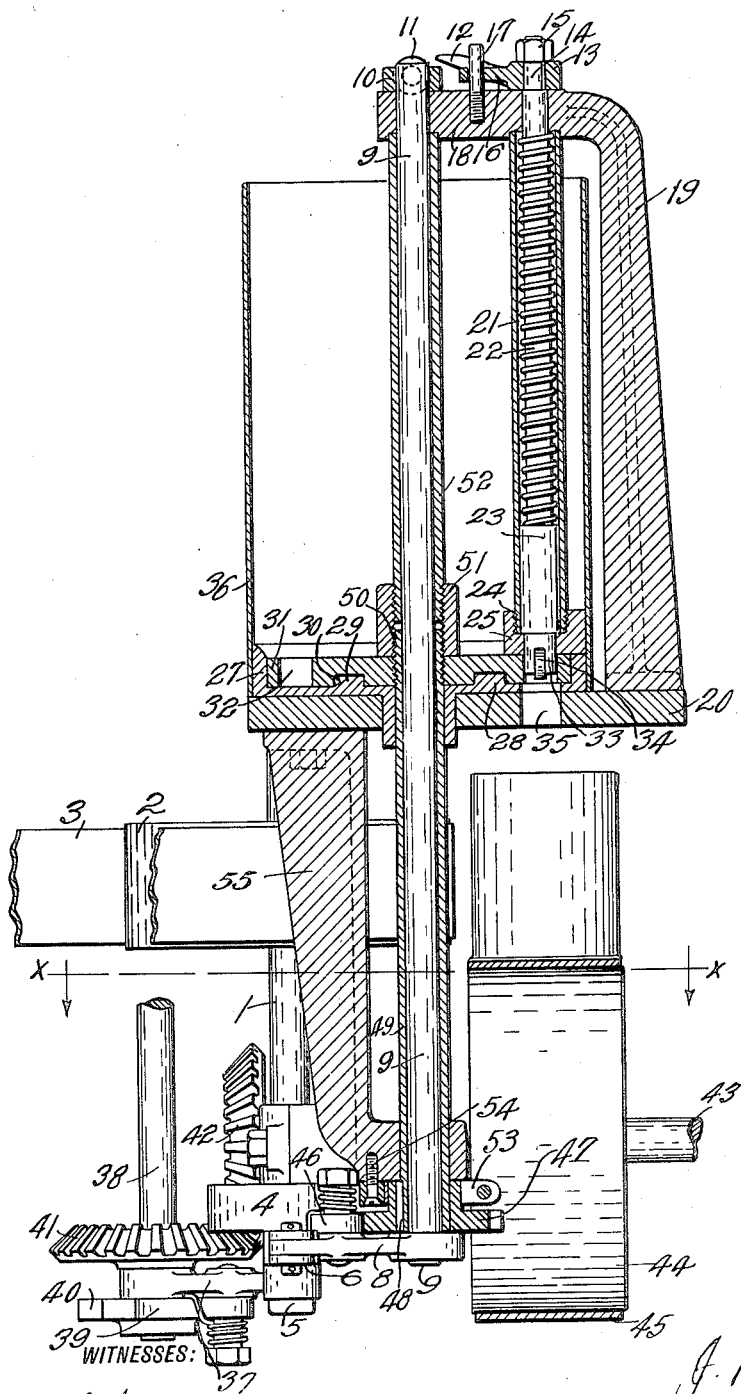

J. P. GOODFELLOW.
CANNING MACHINERY.
APPLICATION FILED AUG. 5, 1913.

1,104,658.

Patented July 21, 1914.
2 SHEETS—SHEET 1.

WITNESSES:
O. Johnson
W.H. Wakefield

INVENTOR
J. P. Goodfellow
BY
Mason Fenwick Lawrence
ATTORNEYS

J. P. GOODFELLOW.
CANNING MACHINERY.
APPLICATION FILED AUG. 5, 1913.
1,104,658.
Patented July 21, 1914.
2 SHEETS—SHEET 2.
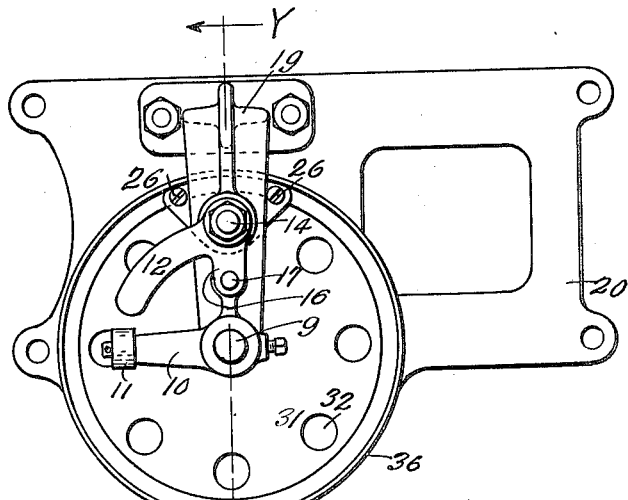
FIG. II
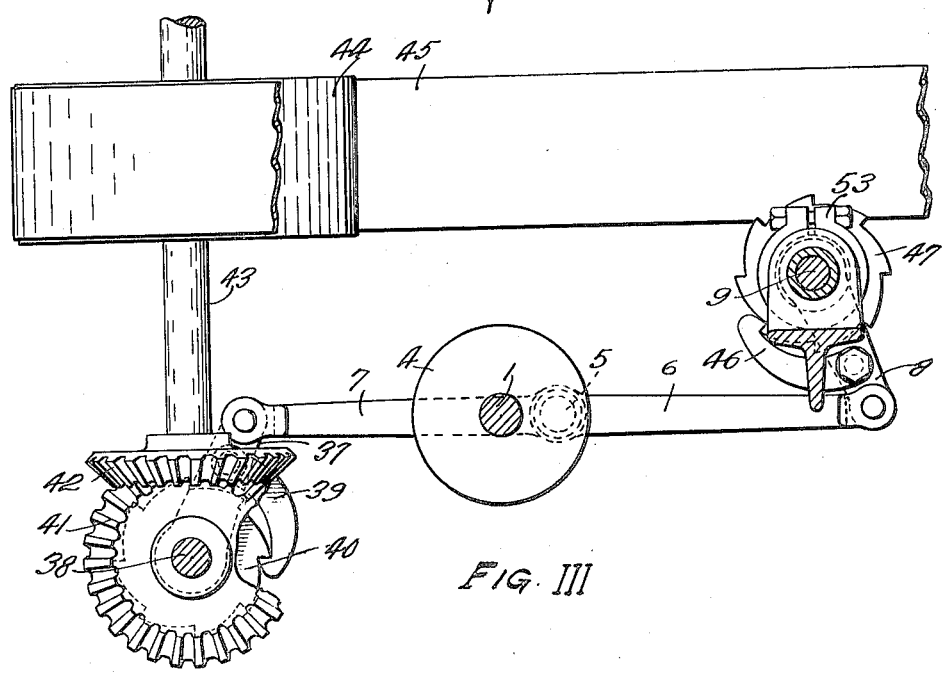
FIG. III
WITNESSES:
O. Johnson
W. H. Wakefield
INVENTOR
J. P. Goodfellow
BY
Mason Fenwick & Lawrence
ATTORNEYS

UNITED STATES PATENT OFFICE.

JOSEPH P. GOODFELLOW, OF BLAINE, WASHINGTON.

CANNING MACHINERY.

1,104,658. Specification of Letters Patent. Patented July 21, 1914.

Application filed August 5, 1913. Serial No. 783,173.

*To all whom it may concern:*

Be it known that I, JOSEPH P. GOODFELLOW, a citizen of the United States, residing at Blaine, in the county of Whatcom and State of Washington, have invented certain new and useful Improvements in Canning Machinery; and I do hereby declare the following to be a full, clear, and exact description of the invention, such as will enable others skilled in the art to which it appertains to make and use the same.

This invention relates to improvements in machines for delivering salt or other condiment to cans which are to receive fish or other food to be preserved, and an object of the invention is to provide a machine which will positively discharge a measured amount of such condiment periodically.

A further object of the invention is to provide a condiment discharging machine with a rocking arm, one end of which actuates a device for delivering cans in proper position while the other end actuates similar mechanism for furnishing the desired amount of condiment.

A further object of the invention is to provide a machine for delivering condiment wherein fixed parts of the actuating mechanism are located eccentrically with respect to the axis of rotation of the condiment carrying device, so that at all times the contents of the can will be agitated to prevent caking.

With these and other objects in view the invention comprises certain novel construction, combinations and arrangement of parts as will be hereinafter more fully described and claimed.

In the accompanying drawings: Figure 1 is a central vertical section of the machine taken upon line *y—y* of Fig. 3. Fig. 2 is a top plan view of the upper part of the machine, and Fig. 3 is a horizontal section looking down along the line *x—x* of Fig. 1.

Like characters of reference designate corresponding parts throughout the several views.

Heretofore in fish canneries, etc., where it has been desired to discharge a given amount of salt or other condiment to the can before the reception of food it has been the custom to manually operate perforated wooden blocks which previously receive a measured amount of salt, but the use of such a device has resulted in unsatisfactory service inasmuch as some of the cans pass without being salted, and the salt becomes polluted with lubricant or other loose matter connected with the machine. These wooden blocks have also had no means for positively discharging salt when in the wet condition and as the conditions around fish factories are usually such that the salt is more or less moist, it is desirable to scrape all of the salt from the walls of the containing receptacle when discharging the same. The present invention aims to accomplish this result by providing a rotatably mounted perforated plate which receives a positively actuated plunger located eccentrically with respect to the axis of the receptacle for the purpose of agitating the salt, said plunger being reciprocated by a cam which engages the trip connected to a shaft operated by a rocker arm connected to any suitably driven pulley or other power wheel.

In the accompanying drawings wherein one embodiment of the invention is shown, there is shown a shaft 1 connected to a pulley 2 which is driven by a belt 3 actuated by any suitable mechanism not shown. Secured to the lower end of the shaft 1 is a pitman wheel 4 having depending from the lower side thereof a pin 5 to which is connected a pair of rocker arms 6 and 7. It is obvious that as the shaft rotates, the pitman wheel 4 will be rotated so that the rocker arms 6 and 7 will be reciprocated by means of the pin 5.

The outer end of rocker arm 6 is pivotally connected to an auxiliary arm 8 which is secured in any suitable manner to the lower end of a shaft 9 extending the full height of the machine. The upper end of this shaft 9 is provided with a trip arm 10 the outer end of which carries a roller 11 adapted to engage the under surface of the trip cam 12. The cam 12 is cast integral with a collar 13 which is held to a plunger 14 by means of a nut 15, and said cam is held against rotation with respect to the plunger 14 by means of a perforated projection 16 which is guided by means of a pin 17 carried in the horizontal arm 18 of a bracket 19 supported upon the plate or body 20 of the machine. The trip arm 10 rests upon the top of the horizontal arm 18 and in this way serves to support the shaft 9. The plunger 14 passes through a tubular housing 21 and is surrounded by a spring 22, the upper end of said spring bearing against the bracket 19 while the lower end engages the shoulder of a plunger 23. The lower end of the tubular housing 22 is threaded as at 24 and is secured by means of a corresponding thread to a block 25, which block 25 is secured by means of screws 26 to a flange 27 of a plate 28, said plate 28 being rigid with respect to the body 20. The plate 28 is provided with a guide 29 which engages a corresponding groove 30 formed in the disk 31 which constitutes the measuring and delivering member of the machine. This disk is provided with a plurality of perforations 32 which are so proportioned with respect to the axis of rotation of the disk that each of the openings is brought periodically beneath the block 25, so that said openings register with the opening of the block 25 through which the lower reduced end 33 of the plunger 23 passes. This end 33 of the plunger is provided with a roller 34 which engages the upper surface of that portion of the disk which lies between adjacent perforations or openings 32, in this way serving to reduce the friction between the spring actuating plunger and the rotating disk.

The operation of the device thus far described is as follows: As the shaft 1 rotates the arm 6 is given a reciprocating motion which results in an alternating motion of the auxiliary arm 8 which rotates the shaft 9 first in a direction such as to force the roller 11 under the cam 12 and then rotate the shaft 9 in such a way as to remove the roller 11 from the cam 12, the leverage of the several parts being such that the roller 11 moves just far enough under the cam 12 to raise the plunger 23 above the surface of the disk 31. As soon as the disk 31 is rotated sufficiently for one of the openings 32 to register with the reduced portion 33 of the plunger, said reduced portion will be forced into the opening and discharge the salt or other condiment through a discharge duct 35 formed in the body 20 of the machine, this discharge duct 35 being larger than the opening 32 so that none of the salt may adhere to the side thereof. It is to be understood, of course, that the salt or other condiment to be supplied to the cans is held within the hopper 36 which may be of any form.

Any approved form of mechanism may be used for bringing the cans under the discharging duct 35 for the purpose of receiving the measured amount of salt, and I do not wish to be limited to the particular mechanism which is illustrated here for accomplishing this purpose. The can delivering device may comprise an auxiliary arm 37 which is loosely mounted upon a shaft 38 and carries a pawl 39 which engages a ratchet wheel 40 which is rigidly secured to a beveled pinion 41. A second beveled pinion 42 is designed to engage the beveled pinion 41 and has secured thereto a shaft 43 which rotates with a drum 44 over which is led a conveyer belt 45 adapted to receive cans to be filled from any source (not shown). The operation of this particular form of can delivering device is as follows: As the shaft 1 rotates the rocker arm 7 will rotate the auxiliary arm 37 which will cause the pawl 39 to engage the ratchet wheel 40 for turning the shaft 38 always in one direction, the proportion of the rocker arm and auxiliary arm being such with respect to the beveled gears 41 and 42 that the conveyer belt is moved the proper amount and at the proper time.

In order to rotate the disk 31, there is provided upon the auxiliary arm 8 a pawl 46 which coöperates with the ratchet wheel 47 which is feathered as at 48 to a rotatable tubular member 49, the upper end of which is threaded as at 50 to engage corresponding threads cut upon the disk 31, there being provided a lock nut 51 for the purpose of securing the disk and tubular member against relative movement. In order that the contents of the hopper may not engage the shaft 9 there is an auxiliary tubular member 52 provided which is screwed into the upper portion of the lock nut 51 and extends beyond the top of the hopper 36. It will be seen from the structure given that as the rocker arm 6 reciprocates the tubular member 49 will be given a periodic motion in one direction by means of the pawl 46 and ratchet wheel 47. In order to provide means for positively stopping the tubular member 49 and disk 31 there is provided a friction brake 53 which may be secured by means of a screw 54 to the lower end of a bracket 55 comparable with the bracket 19 and depending from the plate 20.

What I claim is:—

1. A measuring device, comprising a hopper, a shaft rotatably mounted with respect to the hopper, a plunger mounted eccentrically with respect to the shaft, a perforated disk rotatably mounted within the hopper, a trip cam secured to said plunger, and an arm carried by the said shaft adapted to engage said trip, said shaft adapted to receive a reciprocating rotary motion.

2. A measuring device, comprising a hopper, a perforated disk mounted within the hopper adapted to rotate intermittently, a plunger, the lower end of which is in line with the perforations, means for raising said plunger periodically, resilient means adapted to force the plunger downwardly, and a housing for said plunger and resilient means, said plunger being arranged eccentrically with respect to the axis of the rotation of the disk.

3. A measuring device comprising a hopper, a shaft rotatably mounted with respect to the hopper, a plunger mounted eccentrically with respect to the shaft, a perforated disk rotatably mounted within the hopper, means for rotating the shaft through a predetermined angle and means carried by the shaft engaging the plunger adapted to raise the plunger intermittently.

In testimony whereof I affix my signature in presence of two witnesses.

JOSEPH P. GOODFELLOW.

Witnesses:
GEORGE D. MONTFORT,
WILLIAM MUDDLETON.